(12) United States Patent
Tache et al.

(10) Patent No.: US 11,607,978 B2
(45) Date of Patent: Mar. 21, 2023

(54) SEAT ACCESSORY TO ENABLE A SLEEP AND REST SURFACE

(71) Applicant: GM Global Technology Operations LLC, Detroit, MI (US)

(72) Inventors: Oscar B. Tache, Farmington Hills, MI (US); Bruce L. Stone, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 17/215,485

(22) Filed: Mar. 29, 2021

(65) Prior Publication Data

US 2022/0305969 A1 Sep. 29, 2022

(51) Int. Cl.
*B60N 2/20* (2006.01)
*B60N 2/34* (2006.01)
*B60N 2/64* (2006.01)
*B60N 2/30* (2006.01)
*B60N 2/28* (2006.01)

(52) U.S. Cl.
CPC .................. *B60N 2/34* (2013.01); *B60N 2/20* (2013.01); *B60N 2/289* (2013.01); *B60N 2/3081* (2013.01); *B60N 2/64* (2013.01); *B60N 2/643* (2013.01); *B60N 2/646* (2013.01)

(58) Field of Classification Search
CPC ........ B60N 2/30; B60N 2/289; B60N 2/2893; B60N 2/3081; B60N 2/3084; B60N 2/3086; B60N 2/643; B60N 2/64; B60N 2/646

See application file for complete search history.

(56) References Cited

U.S. PATENT DOCUMENTS

2022/0063456 A1* 3/2022 Oyama ................ B60N 2/2893

FOREIGN PATENT DOCUMENTS

| DE | 6937529 U | 1/1970 |
| DE | 7503877 U | 7/1975 |
| DE | 102018200666 A1 | 7/2019 |

* cited by examiner

*Primary Examiner* — Syed A Islam
(74) *Attorney, Agent, or Firm* — Vivacqua Crane PLLC

(57) ABSTRACT

A seat accessory for an automobile vehicle includes a seat accessory configuration oriented to be releasably deposited onto a seat base and a seat back of an automobile vehicle seat when the seat back is positioned in a seat back fully reclined and horizontal position. The seat accessory includes a seat base contact portion defining a triangular-shape positioned onto the seat base. A seat back contact portion defining a triangular-shape is positioned onto the seat back. A connecting member directly connects the seat base contact portion to the seat back contact portion.

17 Claims, 3 Drawing Sheets

SEAT ACCESSORY TO ENABLE A SLEEP AND REST SURFACE

INTRODUCTION

The present disclosure relates to automobile vehicle seats and use of vehicle seats in a prone position.

Automobile vehicles including and not limited to cars, battery operated vehicles, autonomous driven vehicles, sport utility vehicles (SUVs), vans, pickup trucks and light duty trucks include seats which can be positioned with a seat back rotated forward and upright during vehicle operation and which can be positioned having the seat back reclined rearward to allow the seat occupant to rest. Known seat designs have seat surfaces which include large contours such as bolsters and lumbar support members provided for occupant comfort and safety during vehicle operation. These seat surfaces, with the seat back reclined horizontally or nearly horizontally do not provide a comfortable sleeping or resting surface for the occupant, for example if the operator elects to stop at a rest area for a short sleep period during travel.

Thus, while current automobile vehicle seat designs achieve their intended purpose during normal travel, there is a need for a new and improved system and method for provision of a comfortable seat surface with the seat reclined to a horizontal position.

SUMMARY

According to several aspects, a seat accessory for an automobile vehicle includes a seat accessory configuration oriented to be releasably deposited onto a seat base and a seat back of an automobile vehicle seat when the seat back is positioned in a seat back fully reclined and horizontal position. The seat accessory includes a seat base contact portion defining a triangular-shape positioned onto the seat base. A seat back contact portion defining a triangular-shape is positioned onto the seat back. A connecting member directly connects the seat base contact portion to the seat back contact portion.

In another aspect of the present disclosure, a seat base end defining a widest portion of the seat base contact portion and including a first flat or planar end surface directly contacting a rotating end of the seat back.

In another aspect of the present disclosure, a tapering end of the seat base portion is oppositely directed to the seat base end.

In another aspect of the present disclosure, a seat back end of the seat back contact portion defines a widest portion of the seat back contact portion and includes a second flat or planar end surface.

In another aspect of the present disclosure, a tapering end of the seat back contact portion extending opposite to the seat back end; and a second contact surface of the seat back portion positioned during use in direct contact with a seat back cover of the seat back.

In another aspect of the present disclosure, the first occupant contact surface, the connecting member and the second occupant contact surface together define an occupant resting surface and are collectively oriented parallel to a horizontal plane when the seat back is positioned in the seat back fully reclined and horizontal position.

In another aspect of the present disclosure, a first contact surface of the seat base portion positioned during use in direct contact with a seat base cover of the seat base.

In another aspect of the present disclosure, the seat base contact portion is positioned between opposed mirror image seat base bolsters connected to opposed sides of the seat base.

In another aspect of the present disclosure, the seat back contact portion is positioned between opposed mirror image seat back bolsters connected to opposed sides of the seat back.

In another aspect of the present disclosure, the seat accessory defines an inflatable device.

In another aspect of the present disclosure, a flat or planar first occupant contact surface of the seat base contact portion is oriented colinear with the connecting member and colinear with a flat or planar second occupant contact surface of the seat back contact portion when the seat back is positioned in the seat back fully reclined and horizontal position.

According to several aspects, a seat accessory for an automobile vehicle includes a seat accessory configured to be releasably deposited onto a seat base and a seat back of an automobile vehicle seat when the seat back is positioned in a seat back fully reclined and horizontal position. The seat accessory has a predefined shape and includes a seat base contact portion defining a triangular-shape positioned onto the seat base. A seat back contact portion defining a triangular-shape is positioned onto the seat back. A flat or planar first occupant contact surface of the seat base contact portion is oriented colinear with a flat or planar second occupant contact surface of the seat back contact portion when the seat back is positioned in the seat back fully reclined and horizontal position.

In another aspect of the present disclosure, a connecting member directly connects the seat base contact portion to the seat back contact portion.

In another aspect of the present disclosure, the seat base contact portion includes a seat base end defining a widest portion of the seat base contact portion and including a first flat or planar end surface. A tapering end extends opposite to the seat base end which is narrower than the seat base end. A first contact surface of the seat base portion is positioned during use to directly contact a seat base cover of the seat base.

In another aspect of the present disclosure, the seat back base contact portion includes a triangular-shape. A seat back end defines a widest portion of the seat back contact portion. A second flat or planar end surface is also provided.

In another aspect of the present disclosure, a tapering end extends opposite to the seat back end; and a second contact surface of the seat back portion is positioned during use to directly contact a seat back cover of the seat back.

In another aspect of the present disclosure, a pillow member extends from the seat back end acting as a head support for an occupant of the seat accessory.

According to several aspects, a method for using a seat accessory to create a resting surface on an automobile vehicle seat, includes: developing a contour map defining a contour of an automobile vehicle seat having a seat base and a folding seat back; locating an occupant resting surface of the automobile vehicle seat with the seat back in a seat back fully rotated position having the seat base and the seat back horizontal; creating a model of a seat accessory by combining the contour map including the seat base, the seat back and the occupant resting surface; and developing the seat accessory having a shape of the model and providing a flat or planar first occupant contact surface above the seat base oriented colinear with a flat or planar second occupant contact surface above the seat back when the seat back is positioned in the seat back fully reclined and horizontal position.

In another aspect of the present disclosure, the method further includes: positioning the seat back of an automobile vehicle seat in the seat back fully reclined position; and releasably depositing the seat accessory onto the seat base and the seat back of the automobile vehicle seat.

In another aspect of the present disclosure, the method further includes directly connecting the seat back contact portion of the seat accessory to the seat base contact portion using a connecting member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
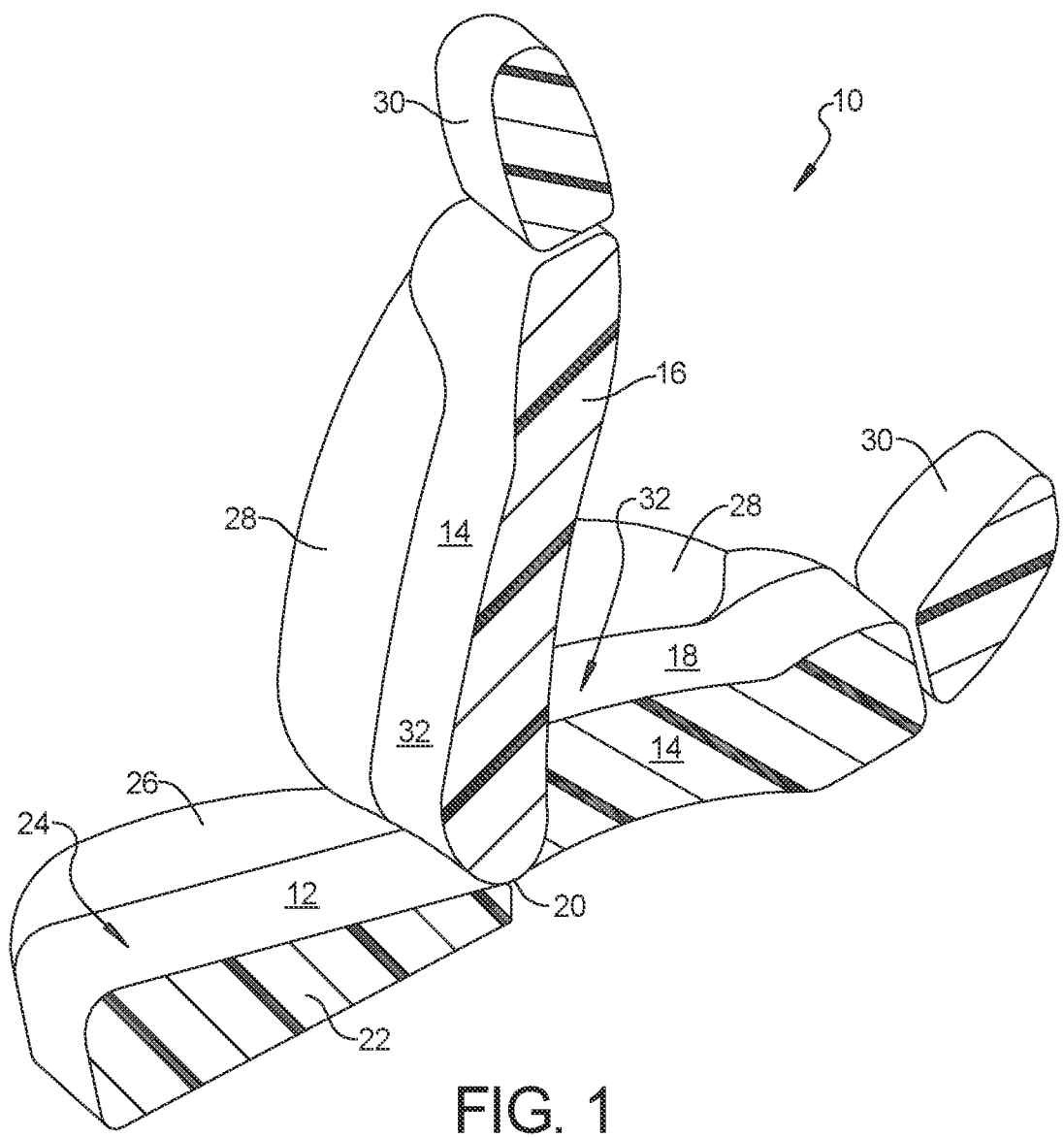
FIG. 1 is a left side partial cross-sectional perspective view of a known automobile vehicle seat.

Referring to FIG. 1, a known vehicle seat 10 for an automobile vehicle commonly includes a seat base 12 connected to a seat back 14. As used herein, automobile vehicles include and are not limited to cars, battery operated vehicles, autonomous driven vehicles, SUVs, vans, pickup trucks and light duty trucks. The seat back 14 is rotatable between a seat upright position 16 used during a driving operation of the automobile vehicle and a seat back fully reclined position 18 with the seat back 14 positioned horizontally. The seat base 12 is rotatably connected to the seat back 14 by at least one hinge member 20.

The seat base 12 may be comprised of an elastically deflectable material pad 22 which may include any or all of a foam, springs, and a polymeric material. The seat base 12 is provided with a seat base cover 24 defining an occupant seating surface made of a material such as leather, a polymeric material and a cloth material. Mirror image seat base bolsters 26 are provided on and directly connected to opposed sides of the seat base 12, only one of which is shown in this view for clarity. The seat base bolsters 26 provide lateral retention and support for the seat occupant and define a raised surface with respect to the seat base 12 on opposed sides of the seat base 12.

The seat back 14 is similarly constructed as the seat base 12 and includes mirror image seat back bolsters 28 on opposed sides of the seat base 12, only one of which is shown in this view for clarity. The seat back bolsters 28 provide lateral retention and support for the seat occupant and define a raised surface with respect to the seat back 14 on opposed sides of the seat back 14. A headrest 30 is extensible upwardly and downwardly from a free end of the seat back 14. The headrest 30 may also be rotatable forwardly and rearwardly by selection of the vehicle operator. The seat back 14 is similar to the seat base 12 and is provided with a seat back cover 32 defining an occupant contact surface also made of a material such as one of a leather, a polymeric material and a cloth material.

Figure 2:
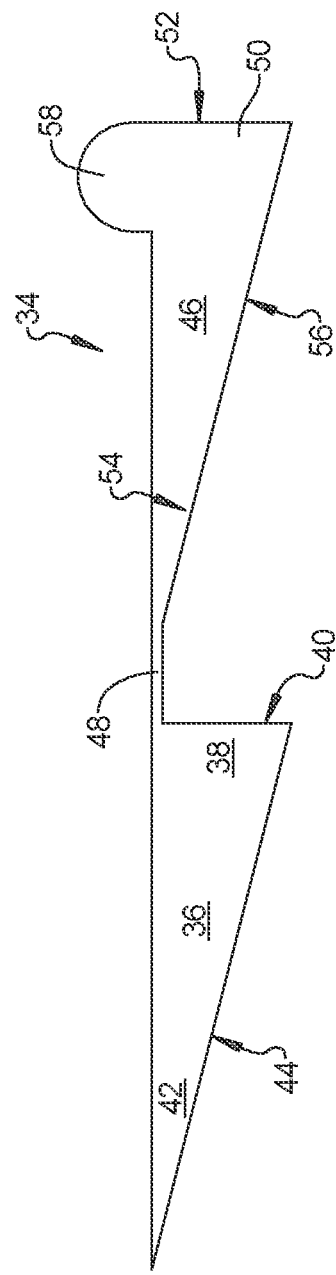
FIG. 2 is a side elevational view of a seat accessory of the present disclosure.
Figure 3:
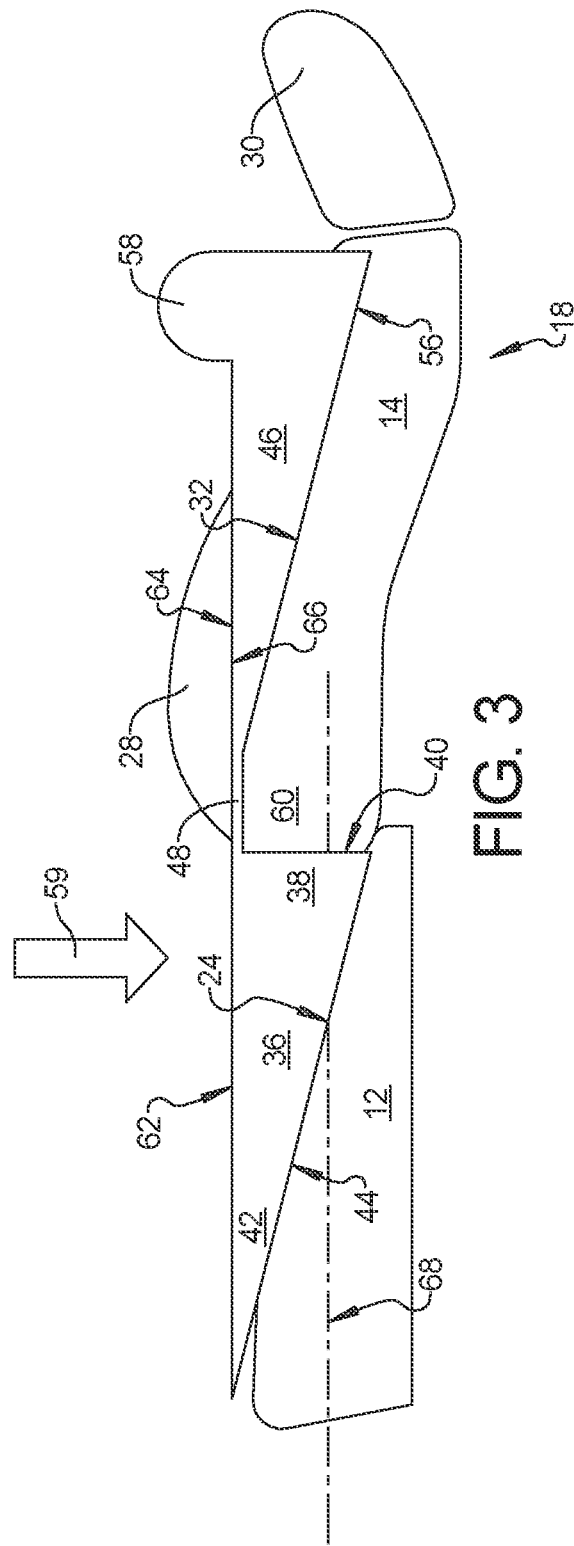
FIG. 3 is a side elevational view of the seat accessory of FIG. 2 in an installed position on the automobile vehicle seat of FIG. 1 with the automobile vehicle seat having a seat back in a seat back fully reclined position.

Referring to FIG. 2 and again to FIG. 1, according to several aspects, a seat accessory 34 is configured to be releasably deposited onto the seat base 12 and the seat back 14 with the seat back 14 in the seat back fully reclined position 18 when the seat back 14 is positioned horizontally as shown in FIG. 3 discussed below. The seat accessory 34 has a predefined shape and is made of a deflectable material such as a foam or a polymeric material or may define an inflatable device. The seat accessory 34 includes a seat base contact portion 36 defining a triangular-shape as viewed in the side elevational view shown. A seat base end 38 defines a widest portion of the seat base contact portion 36 and includes a first flat or planar end surface 40. A tapering end 42 extends opposite to the seat base end 38 and is narrower than the seat base end 38. A first contact surface 44 of the seat base contact portion 36 is positioned during use to directly contact the seat base cover 24 of the seat base 12.

A seat back contact portion 46 of the seat accessory 34 is directly connected to the seat base contact portion 36 using a connecting member 48. The seat back contact portion 46 similar to the seat base contact portion 36 defines a triangular-shape as viewed in the side elevational view shown. A seat back end 50 defines a widest or deepest portion of the seat back contact portion 46 and includes a second flat or planar end surface 52. A tapering end 54 extends opposite to the seat back end 50. A second contact surface 56 of the seat back contact portion 46 is positioned during use to directly contact the seat back cover 32 of the seat back 14. A pillow member 58 may extend from the seat back end 50 which acts as a head support for an occupant of the seat accessory 34. According to several aspects, the connecting member 48 may minimize or totally omit the deflectable material of the seat base contact portion 36 and the seat back contact portion 46.

Referring to FIG. 3 and again to FIG. 2, to use the seat accessory 34, the seat accessory 34 is unfolded from a stowed condition or removed from a storage location in the automobile vehicle and inflated to the geometry shown. The seat 10 is configured with the seat back 14 in the seat back fully reclined position 18 with the seat back 14 positioned horizontally. The seat accessory 34 is then moved in an installation direction 59 and releasably deposited onto the seat base 12 and the seat back 14 having the first contact surface 44 placed in direct contact with the seat base cover 24 and the second contact surface 56 positioned in direct contact with the seat back cover 32. The connecting member 48 directly contacts a rotating end 60 of the seat back 14.

With the seat accessory 34 installed, a flat or planar first occupant contact surface 62 of the seat base contact portion 36 is oriented colinear with the connecting member 48 and colinear with a flat or planar second occupant contact surface 64 of the seat back contact portion 46. The first occupant contact surface 62, the connecting member 48 and the second occupant contact surface 64 together define an occupant resting surface 66 and are collectively oriented parallel to a horizontal plane 68, thereby configuring the occupant resting surface 66 as a horizontal resting surface. The occupant resting surface 66 is thereby temporarily formed.

The seat accessory 34 when configured to define the occupant resting surface 66 positions the seat accessory 34 between the opposed seat base bolsters 26 of the seat base 12 and between the opposed seat back bolsters 28 of the seat back 14. The pillow member 58 is located proximate to the headrest 30. The seat accessory 34 may then be removed in a direction opposite to the installation direction 59 and folded for storage or deflated and stored.

Figure 4:
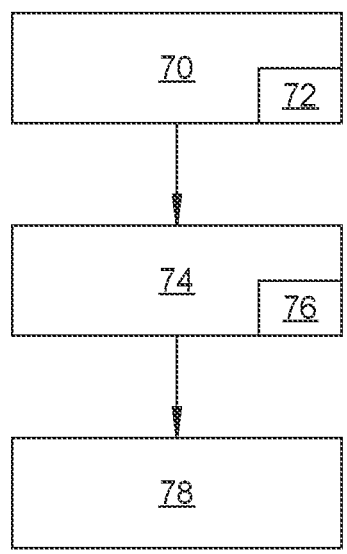
FIG. 4 is a flow diagram defining steps for creating the seat accessory of FIG. 2.

Referring to FIG. 4 and again to FIGS. 1 through 3, steps for creating the seat accessory 34 may include the following. First, in a development step 70 a contour map 72 is developed defining a contour of the applicable folded seat base 12 and seat back 14. Next, with a defined occupant resting surface 66 located, in a model development step 74 a model 76 is created by combining the contour of the applicable folded seat base 12 and seat back 14 and the occupant resting surface 66. In an installation step 78, a seat accessory 34 such as a foam member, an inflatable member or the like is developed that takes the shape of the above model 76 for the occupant to use.

The seat accessory 34 is tailored to fit exact seat base cushion and seat back cushion contours of a specific vehicle's folded seat 12. A seat accessory 34 made for example as an inflatable device, from foam, or the like that is tailored to fit a surface of a folded down vehicle seat 10 allows for a uniform resting surface while being less complex to implement than a mechanically driven system.

Known automobile vehicle accessory sleep devices are flat air-mattress-like beds which are not contoured to the seat surface or utilize complex seat mechanics that use motors and mechanical members to move and articulate the seat members to achieve a resting surface.

A seat accessory of the present disclosure offers several advantages. These include allowance of a "tailored" fit of a contoured accessory device that rests on top of a down-folded automobile vehicle seat which creates a bed-like surface on upward facing or top surfaces of the down-folded seat. The seat accessory further creates a flat or planar sleeping or resting surface that on surfaces facing away from the flat or planar sleeping or resting surface are compatible with varying contours of the articulated seat. Seat features such as bolsters, pillow bumps, or other features may also be contoured into the contacting surfaces of the accessory device.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat accessory for an automobile vehicle, comprising:
    a seat device releasably deposited onto a seat base and a seat back of an automobile vehicle seat when the seat back is positioned in a seat back fully reclined and horizontal position, the seat device including:
        a seat base contact portion defining a triangular-shape positioned onto the seat base;
        a seat back contact portion defining a triangular-shape positioned onto the seat back; and
        a connecting member directly connecting the seat base contact portion to the seat back contact portion.

2. The seat accessory of claim 1, including a seat base end defining a widest portion of the seat base contact portion and including a first planar end surface directly contacting a rotating end of the seat back.

3. The seat accessory of claim 2, further including a tapering end of the seat base contact portion oppositely directed to the seat base end.

4. The seat accessory of claim 1, including a seat back end of the seat back contact portion defining a widest portion of the seat back contact portion and including a second planar end surface.

5. The seat accessory of claim 4, further including a tapering end of the seat back contact portion extending opposite to the seat back end; and a second contact surface of the seat back contact portion positioned during use in direct contact with a seat back cover of the seat back.

6. The seat accessory of claim 1, wherein a first occupant contact surface of the seat base contact portion, the connecting member and a second occupant contact surface of the seat back contact portion together define an occupant resting surface and are collectively oriented parallel to a horizontal plane when the seat back is positioned in the seat back fully reclined and horizontal position.

7. The seat accessory of claim 1, further including a first contact surface of the seat base portion positioned during use in direct contact with a seat base cover of the seat base.

8. The seat accessory of claim 1, wherein the seat base contact portion is positioned between opposed mirror image seat base bolsters connected to opposed sides of the seat base.

9. The seat accessory of claim 1, wherein the seat back contact portion is positioned between opposed mirror image seat back bolsters connected to opposed sides of the seat back.

10. The seat accessory of claim 1, wherein the seat accessory defines an inflatable device.

11. The seat accessory of claim 1, wherein a planar first occupant contact surface of the seat base contact portion is oriented colinear with the connecting member and colinear with a planar second occupant contact surface of the seat back contact portion when the seat back is positioned in the seat back fully reclined and horizontal position.

12. A seat accessory for an automobile vehicle, comprising:
    a seat device releasably positioned onto a seat base and a seat back of an automobile vehicle seat when the seat back is positioned in a seat back fully reclined and horizontal position, the seat device including:
        a seat base contact portion defining a triangular-shape positioned onto the seat base;
        a seat back contact portion defining a triangular-shape positioned onto the seat back; and
        a planar first occupant contact surface of the seat base contact portion is oriented colinear with a planar second occupant contact surface of the seat back contact portion when the seat back is positioned in the seat back fully reclined and horizontal position.

13. The seat accessory of claim 12, including a connecting member directly connecting the seat base contact portion to the seat back contact portion.

14. The seat accessory of claim 12, wherein the seat base contact portion includes:
    a seat base end defining a widest portion of the seat base contact portion and including a first planar end surface;
    a tapering end extending opposite to the seat base end narrower than the seat base end; and
    a first contact surface of the seat base portion is positioned during use to directly contact a seat base cover of the seat base.

15. The seat accessory of claim 12, wherein the seat back contact portion includes:
   a triangular-shape;
   a seat back end defining a widest portion of the seat back contact portion; and
   a second planar end surface.

16. The seat accessory of claim 15, including:
   a tapering end extending opposite to the seat back end; and
   a second contact surface of the seat back contact portion is positioned during use to directly contact a seat back cover of the seat back.

17. The seat accessory of claim 15, including a pillow member extending from the seat back end acting as a head support for an occupant of the seat accessory.

\* \* \* \* \*